(12) United States Patent
Shearer, Jr. et al.

(10) Patent No.: US 6,513,642 B1
(45) Date of Patent: Feb. 4, 2003

(54) CONVEYOR SYSTEM WITH DIVERTING TRACK NETWORK

(75) Inventors: James T. Shearer, Jr., Ada, MI (US); William W. Viet, Ada, MI (US)

(73) Assignee: Rapistan Systems Advertising Corp., Grand Rapids, MI (US)

( * ) Notice: Subject to any disclaimer, the term of this patent is extended or adjusted under 35 U.S.C. 154(b) by 0 days.

(21) Appl. No.: 09/606,610

(22) Filed: Jun. 29, 2000

(51) Int. Cl.$^7$ .......................... B65G 47/10; B65G 47/24
(52) U.S. Cl. .................. 198/370.02; 198/412; 198/415
(58) Field of Search .................. 198/370.02, 890, 198/412, 415, 890.1, 367.1, 723, 364, 717

(56) References Cited

U.S. PATENT DOCUMENTS

| | | | | |
|---|---|---|---|---|
| 2,868,394 A | | 1/1959 | Greller et al. | 198/370.02 |
| 2,984,366 A | | 5/1961 | Greller | 198/349.1 |
| 3,361,247 A | | 1/1968 | Lauzon et al. | 198/350 |
| 3,384,237 A | | 5/1968 | Leonard | 198/349.9 |
| 3,710,923 A | | 1/1973 | Fromme et al. | 198/370.02 |
| 3,771,648 A | | 11/1973 | Revuelta | 198/364 |
| 4,214,663 A | | 7/1980 | Schopp et al. | 209/552 |
| 4,487,308 A | | 12/1984 | Focke et al. | 198/412 |
| 4,501,365 A | | 2/1985 | Peyton et al. | 209/548 |
| 4,711,341 A | | 12/1987 | Yu et al. | 198/370.02 |
| 4,717,011 A | * | 1/1988 | Yu et al. | 198/370.02 |
| 4,732,259 A | * | 3/1988 | Yu et al. | 198/368 |
| 4,738,347 A | | 4/1988 | Brouwer et al. | 198/370.02 |
| 4,760,908 A | * | 8/1988 | Houghton | 198/370.02 |
| 4,884,677 A | | 12/1989 | Yu et al. | 198/370.02 |
| 4,896,760 A | | 1/1990 | Triantafilou et al. | 198/370.02 |
| 5,038,912 A | | 8/1991 | Cotter | 198/370.02 |
| 5,127,510 A | | 7/1992 | Cotter et al. | 198/370.02 |
| 5,165,515 A | | 11/1992 | Nitschke et al. | 198/349.95 |
| 5,167,315 A | * | 12/1992 | Doane | 198/440 |
| 5,217,105 A | * | 6/1993 | Sapp et al. | 198/370.02 |
| 5,333,715 A | * | 8/1994 | Sapp | 198/370.02 |
| 5,409,095 A | | 4/1995 | Hoshi et al. | 198/370.13 |
| 5,613,591 A | * | 3/1997 | Heit et al. | 198/370.02 |
| 5,664,661 A | | 9/1997 | Maier | 198/412 |
| 5,927,465 A | | 7/1999 | Shearer, Jr. | 198/370.02 |
| 5,967,289 A | * | 10/1999 | Kelsey | 198/370.02 |
| 6,041,909 A | | 3/2000 | Shearer, Jr. | 198/370.02 |
| 6,044,956 A | * | 4/2000 | Henson et al. | 198/370.02 |
| 6,139,240 A | * | 10/2000 | Ando | 198/370.02 |

FOREIGN PATENT DOCUMENTS

| | | |
|---|---|---|
| DE | 2745298 | 11/1978 |
| EP | 0506494 | 8/1996 |
| JP | 5516933 | 5/1980 |
| JP | 1317914 | 12/1989 |

\* cited by examiner

*Primary Examiner*—D. Glenn Dayoan
*Assistant Examiner*—Patricia L. Engle
(74) *Attorney, Agent, or Firm*—Van Dyke, Gardner, Linn & Burkhart, LLP

(57) ABSTRACT

A conveyor system having an endless conveying surface, a plurality of diverters, and diverting shoes transversely movable across the conveying surface, includes a diverting track network in operational connection with a controller. The controller measures the length of each package, while the diverting track network includes a plurality of upstream diverting tracks and at least one downstream diverting track. The controller selectively actuates a diverter associated with downstream diverting track and at least one diverter along a particular upstream diverting track to engage the package proximate to its leading and trailing end. The diverting track network is configured to initially move the package in a direction generally parallel to the direction of movement of the main conveyor, and out of alignment with the articles traveling therealong, and subsequently rotate the article so that when discharged to a branch conveyor, the leading end of the article is more nearly orthogonal to the direction of motion of the branch conveyor.

51 Claims, 9 Drawing Sheets

CONVEYOR SYSTEM WITH DIVERTING TRACK NETWORK

BACKGROUND OF THE INVENTION

This invention relates generally to conveyor diverting systems, and, more particularly, to conveyor diverting systems having an endless conveying surface composed of multiple surface members, each one or group of adjacent ones mounted with a laterally movable shoe capable of diverting articles from the conveyor by pushing laterally against the articles as they move down the conveyor. Such lateral pushing thereby diverts a package, such as from the main conveyor to an adjacent branch conveyor, or other receiving structure.

Conveyor diverting systems using a moving conveying surface consisting of a plurality of parallel surface members, the conveying surface being propelled, such as by being mounted to endless chains, have been known for a number of years. Such diverting systems utilize a diverter shoe movably mounted on one or more surface members for lateral movement with respect to the conveying surface under the guidance of a track network. The track network is located generally under the conveying surface and guides the diverter shoes via pins descending from the diverter shoes and engaging the track network. Diverters in the track network selectively transfer guidance of each diverter shoe from a track running in the direction of the movement of the conveying surface to a diagonal track, or plurality of diagonal tracks, in order to cause lateral movement of the diverter shoes. An example of a diverting gate used to selectively transfer guidance of diverter shoes between tracks is disclosed in U.S. Pat. No. 5,409,095, issued to Hoshi et al., and U.S. Pat. No. 5,039,912, issued to Cotter. In order to avoid wasted spacing between variable-length packages, such diverting systems may include manual or automatic measuring means at an infeed point to cause the diverter gate associated with the selected branch conveyor to divert a selected number of shoes corresponding in general to the length of the package. Exemplary of this type of conveyor are U.S. Pat. No. 3,361,247, issued to James N. Lauzon et al. and U.S. Pat. No. 4,738,347, issued to Brouwer, and commonly assigned with the present invention.

With increased demands for the number of packages to be conveyed by such conveying systems, the inter-package spacing distance has become a critical factor in the design of conveying systems. Decreasing the spacing between packages on the conveyor allows a greater throughput of packages by the conveyor. Conversely, providing more space between the packages results in a diminished efficiency and throughput.

A specific minimum inter-package spacing is required in this system as a result of the rotation of the diverted package as it is initially diverted. Because of this rotation, additional inter-package spacing is required to avoid conflict between the diverting package and a closely trailing package. This rotation pushes the trailing corner of the package adjacent the branch conveyor back a distance, which can be estimated using the width (W) of the package and the acute angle (θ) which is formed by the intersection of the material flow on the main conveyor and the diverter shoe diagonal guide track. Using these two variables and assuming that the package rotates about the trailing corner opposite the branch conveyors, it will be observed that:

$$A = W \sin \theta$$

where A is the distance the trailing corner adjacent the branch conveyor is pushed back by the package's rotation. It is, therefore, necessary with this system that packages to be diverted are not spaced closer together than the distance $W \sin \theta$.

By way of example, if a diverting branch is oriented at about 20° with packages 16 inches in width, an inter package distance of approximately 5.5 inches is necessary. If the package is 24 inches long, this results in the need for approximately 23% more empty space on the conveyor. A hypothetical system that could divert packages without any significant space between packages could thus produce a 23% increase in package throughput without any increase in conveyor speed. The high desirability of such a system is thus clear.

Prior methods of diverting packages that addresses the problem of reducing the required inter-package spacing, is described in commonly assigned U.S. Pat. No. 5,165,515, issued to Michael L. Nitschke et al., which is commonly assigned with the present application. This system increases throughput by not rotating the diverted packages. This non-rotation is accomplished by using a plurality of generally parallel diverting tracks oriented diagonally with respect to the direction of conveyor movement, instead of a single diverting track. Each track has its own diverting gate which is actuated to divert the movement of the diverting shoes from the direction of the conveyor to the lateral diverting direction. By simultaneously activating more than a single diverting gate, a group of diverting shoes corresponding to the measured package length can be moved laterally across the conveyor surface. This group of shoes acts along nearly the entire length of the package to be diverted and, therefore, causes no rotation of the package. Without rotation of the package, the inter-package spacing requirement is reduced to a minimum.

However, this technique is not without difficulties. The deliberate non-rotation of the packages means the packages will enter the branch conveyor still aligned parallel to the main conveyor, but oriented generally diagonally with respect to the branch conveyor (i.e., their lengthwise sides are not parallel to the direction of motion of the branch conveyor). This orientation significantly increases the necessary width of the branch conveyors, resulting in an increase in cost and a reduction in the spacing on branch conveyors.

Still another method of diverting packages which reduces the required inter-package spacing, is described in commonly assigned U.S. Pat. No. 5,927,465, issued to Shearer, Jr. With this system, an automatic controller oversees the operation of the diverting gates to determine which diverting gates are to be actuated and for how long, depending upon the measured length of the packages on the conveyor. Once the length of the package is determined, the controller determines whether a package will be diverted using one diverting gate or two (or more) diverting gates. For certain situations, such as long packages, a single diverter is activated and as many diverting shoes are diverted as necessary to divert the package through the single diverting gate. Packages diverted in this manner are rotated, with the trailing corner of the package moving in an initial rearward direction.

Other packages are diverted with two or more gates in a manner that the packages are initially diverted out of line with other packages without substantially rotating the packages, in the same manner as in Nitschke et al. '515 Patent. After the initial diverting, the package is then rotated prior to discharge to the spur. This has the advantage of the Nitschke et al. '515 Patent of not requiring increased gaps between packages but eliminates the disadvantage of increased spur size. However, some of the packages, such as long packages, are still diverted using conventional techniques and increased gaps must be provided at both ends of such packages.

It will thus be observed that there exists a need for a conveyor diverting system that can divert packages with little or no inter-package spacing, and ensure that packages diverted to the branch conveyor are properly aligned, all while keeping costs to a minimum.

SUMMARY OF THE INVENTION

The present invention provides a sortation conveyor which achieves efficiency gains through reduction of the inter-package spacing. These efficiency gains are especially desirable because they can be achieved without the extra power consumption, noise, and wear that results from increasing the conveyor speed. The present invention increases conveyor diverting system throughput by utilizing a diverting track network having at least one downstream diverting track and a plurality of upstream diverting tracks. The tracks are configured to enable movable pushers to initially divert a package in an orientation which prohibits the article being diverted from interfering with the trailing article.

According to one aspect of the invention, a conveyor system includes a conveyor surface having a direction of travel, which conveys articles substantially in a line. Movable pushers are mounted on the conveying surface and are adapted to move transversely thereacross. A diverting track network, positioned beneath the conveying surface, is configured to move at least two movable pushers substantially perpendicular to the direction of travel of the conveying surface for at least an initial distance, and thereafter to guide the movable pushers in a direction which causes the rotation of at least some of the articles being diverted after being placed out of line with the other articles. The ability of the diverting track network to initially move an article from the line of articles in a direction substantially perpendicular to the direction of travel of the conveying surface, and thereafter subsequently rotate at least some of the articles being diverted enables the minimization of space between articles, and hence increases throughput.

According to another aspect of the invention, a conveyor system for diverting articles includes a conveying surface moving in a particular direction, and at least one branch conveyor extending from the conveying surface. A plurality of diverters are mounted on the conveying surface and are movable between a diverting state and a non-diverting state, while a plurality of movable pushers, mounted on the conveying surface, are movable across the conveying surface when a particular diverter is in the diverting state. A control system is configured to determine the length of articles conveyed, and is connected to a diverting system having at least one downstream diverting track extending substantially across the conveying surface, and a plurality of upstream diverting tracks which each extend partially across the conveying surface. The diverting system simultaneously diverts at least one movable pusher along the downstream diverting track when the leading end of the article to be diverted is positioned thereover, and at least one movable pusher along an upstream diverting track, proximate to the trailing end of the article. Simultaneously actuating at least a pair of movable pushers to engage an article to be diverted, proximate to both its leading end and trailing end, assures effective diversion of articles from the conveying surface.

According to yet another aspect of the invention, a conveyor system for converting articles includes an array of movable surface members defining a conveying surface, and a plurality of diverting shoes mounted on the surface members. A guide track is positioned below the surface members and adapted to guide the diverting shoes. A plurality of diverters are positioned along and interrupt the guide track, and assume either a non-diverting state or a diverting state. When in the non-diverting state, the diverting shoes move along the guide track uninterrupted, while in the diverting state, the diverting shoes are diverted from the guide track. A diverting track network, positioned underneath the conveying surface, meets the diverters, and includes at least one downstream diverting track extending substantially across the conveying surface and a plurality of upstream diverting tracks, each of which extends partially across the conveying surface. A controller, in operational connection with at least one sensor, simultaneously actuates a first diverter to divert a diverting shoe along the downstream diverting track when the first diverter is proximate to the leading end of the article, and a second diverter proximate to the trailing end of the article. Actuating a first diverter farthest downstream, and proximate to the leading end of the article and a second diverter upstream and proximate to the trailing end of the article effectively enables the diversion of articles onto a branch conveyor.

The present invention also advances a method for diverting articles which includes the steps of conveying articles substantially in a line with the conveying surface, and applying a perpendicular force component to substantially all the articles to be diverted. The perpendicular force component is substantially perpendicular to the direction of conveyor motion and diverts the article initially out of line with the other articles traveling along the conveying surface. The perpendicular force component is then altered for at least some of the articles after the article is diverted out of line, by including a rotational force component during a subsequent portion of the diverting motion. Initially diverting an article out of a line of articles, and subsequently rotating the article after it has been diverted from the line, permits the spacing between articles to be minimized, and therefore enhances the efficiency and throughput of the conveyor system.

According to yet another aspect of the invention, a method for diverting articles includes measuring the length of the articles conveyed along the conveying surface, and providing a diverting track network positioned beneath the conveying surface which includes at least one downstream diverting track laterally traversing substantially the entire conveying surface, and a plurality of upstream tracks partially laterally traversing the conveying surface. A plurality of diverters are provided which cause the movable pushers to move along the associated track, at least partially across the conveying surface when a diverter is activated to a diverting state. The method also includes simultaneously activating at least two of the diverters wherein one of the diverters is associated with the downstream diverting track and positioned proximate to the leading end of the article, and the other diverter is positioned proximate to the trailing end of the article. Diverting articles from a conveying surface by activating at least two diverters wherein one diverter, associated with the downstream track, is actuated when the leading end of the article is positioned thereover, and the other diverter is proximate to the trailing end of the article provides an efficient method for diverting articles onto a secondary conveying surface.

These and other objects, advantages, and features of this invention will become apparent upon review of the following specification in conjunction with the drawings.

DESCRIPTION OF THE PREFERRED EMBODIMENTS

Figure 1:
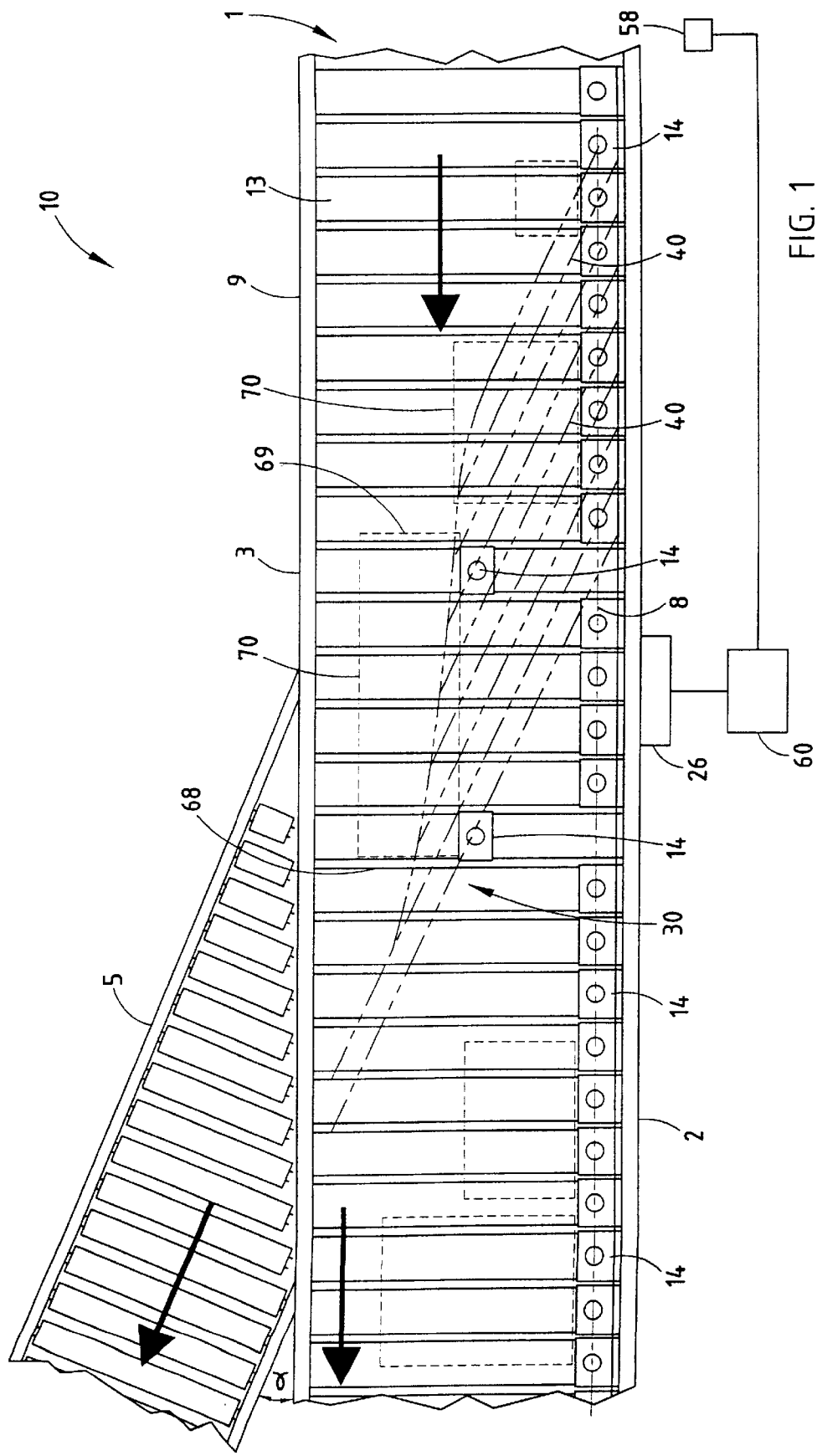
FIG. 1 is a top plan view of a conveyor system according to the invention.

Referring specifically to the drawings and the illustrative embodiments therein, a conveying system 10 includes a main conveyor 9 and a plurality of branch conveyors 5, of which only one is shown. Although the invention is illustrated for use with a unidirectional divert conveyor, it should be understood that its principles may also be used with bi-directional divert conveyors. Branch conveyor 5 is positioned adjacent to main conveyor 9, and at an angle, as is conventional. The arrows illustrate the direction of conveyance for both main conveyor 9 and branch conveyor 5.

A conveying surface 1 of main conveyor 9 is defined by a series of surface members 13 which define a product conveying surface. The lengthwise direction of surface members 13 is oriented perpendicular to the direction of movement of main conveyor 9. Surface members 13 are supported on either side by side members 2 and 3. The details of the interconnections of the surface members with each other are disclosed in U.S. Pat. No. 5,127,510, issued to Cotter et al., the disclosure of which is hereby incorporated herein by reference and will not be repeated.

A series of movable pushers, or diverting shoes, 14 are located along main conveyor opposite branch conveyor 5 and proximate to side member 2. When diverting shoes 14 are not being utilized to push an article off main conveyor 9 and onto branch conveyor 5, they travel in sequence along a shoe guideway 8, adjacent the longitudinally extending guide track 12. Guide track 12 prevents diverting shoes 14 from moving transversely across main conveyor 9 except at the point along main conveyor 9 at which diverters 25a through 25i are located, or along similar points where a branch conveyor connects to main conveyor 9. Diverting gates 25a through 25i can be seen attached along side member 2 of main conveyor 9, and in the path of diverting shoes 14. Diverters 25a through 25i are preferably of the type disclosed in U.S. Pat. No. 5,038,912, issued to Cotter, the disclosure of which is hereby incorporated herein by reference. Alternately, diverters 25a through 25i may be of the type disclosed in U.S. Pat. No. 5,409,095, issued to Hoshi et al., the disclosure of which is hereby incorporated herein by reference.

Figure 2:
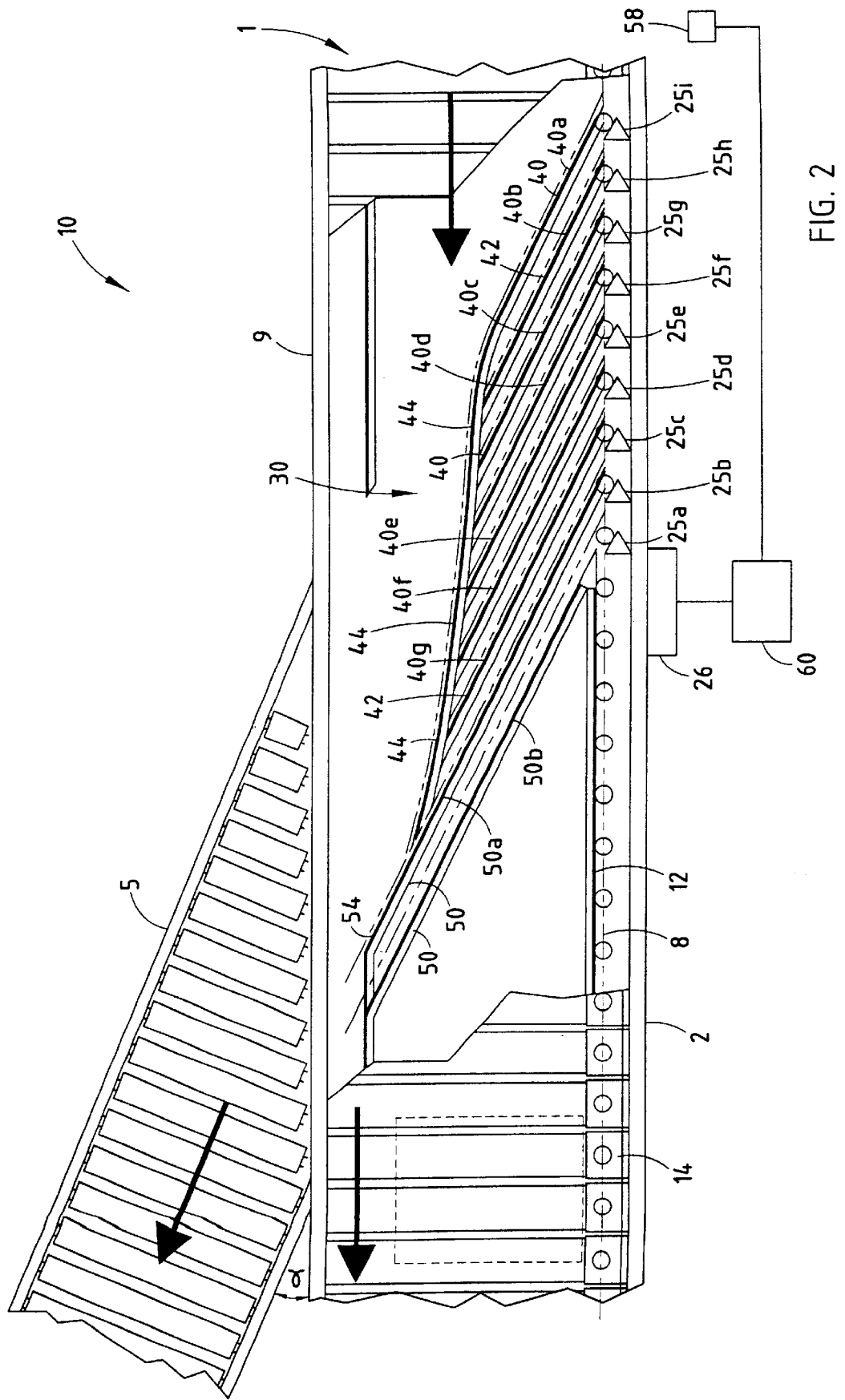
FIG. 2 is a top plan view of the conveyor system of FIG. 1, with a center portion of the conveying surface removed to illustrate the underlying structure.

With reference to FIG. 2, a section of conveying surface 1 has been removed from the central portion of main conveyor 9 to illustrate the structure of a diverting track network 30. Diverting track network 30 includes a plurality of first, or upstream diverting tracks 40, and one or more second, or downstream, diverting tracks 50. Although there are seven upstream diverting tracks 40 and two downstream diverting tracks 50 illustrated in FIG. 2, it is within the spirit and scope of the invention to have any number of upstream diverting tracks 40 and downstream diverting tracks 50. In general, diverting tracks 40, 50 span the maximum article length to be transported by conveyor system 10, as will be discussed in detail hereinbelow. Downstream diverting tracks 50 traverse substantially the entire conveying surface 1 at a preselected angle to the direction of movement of main conveyor 9. Each downstream diverting track 50 may be generally straight or linear throughout its length. Each upstream diverting track 40 terminates partway across conveying surface 1, at a location that generally relates to the width of the package stream conveyed by conveyor 10. In the illustrated embodiment, each diverting track 40 includes a linear, or first section 42 which is generally parallel to downstream diverting tracks 50, and a second section 44 projecting from the end of first section 42, and extending downstream at an obtuse angle to first section 42. Each second section 44 of upstream diverting tracks 40 is operably coupled to the second section 44 of the adjacent upstream diverting track 40. Second section 44 of the upstream diverting track 40 adjacent to, and immediately upstream of, first downstream diverting track 50a is operably connected to downstream diverting track 50a, a preselected distance below end 54. Upstream diverting tracks 40 may be integrally formed with second section 44 bent to achieve the preselected angle. Alternatively, second section 44 may be a separate member, operably coupled to first section 42 by any means commonly employed in the art. Collectively, second sections 44 form an upwardly curved path, toward side member 3, as they approach downstream diverting track 50a.

Downwardly depending portions of diverting shoes 14 are diverted to specific upstream diverting tracks 40a through 40g, and downstream diverting tracks 50a and 50b by a dedicated diverter 25a through 25i. Diverters 25a through 25i are electrically actuated, for example, by shoe divert solenoids, in electrical connection with a divert control module 26 as disclosed in Cotter '192 or by magnetic attraction of a portion of the diverting shoe as disclosed in Hoshi et al. '095. It will be recognized by those with ordinary skill in the art that diverters 25a through 25i may be controlled by any means commonly recognized in the art without departing from the spirit and scope of the invention.

The number of upstream diverting tracks 40 utilized in conveyor system 10 is dictated by the maximum length of a package to be handled by the conveyor system. Preferably, the distance between downstream diverting track 50b and upstream diverting track 40a farthest upstream is approximately equal to, or greater than, the maximum length of packages to be diverted along conveyor system 10. The longitudinal spacing between upstream diverting tracks 40 and downstream diverting tracks 50 may be substantially equal to the longitudinal distance of a single surface member 13, so that each diverting shoe 14 positioned over upstream diverting tracks 40 and downstream diverting tracks 50 may be selectively actuated by the associated diverter 25a through 25i. Alternatively, the longitudinal spacing between upstream diverting tracks 40 and downstream diverting tracks 50 may be some multiple, such as twice the width of a surface member 13, such that every other diverting shoe 14 may be selectively actuated when positioned over diverting tracks 40, 50 without departing from the scope of the invention.

Conveyor system 10 is equipped with at least one sensor 58, operably connected to a control system 60, to thereby determine the length of each package being transported along conveyor system 10. Sensor 58 may be any sensor commonly used in the art, and is positioned in proximity to, or along main conveyor 9, upstream of diverting track network 30 or upstream of main conveyor 9. Control system 60 is in electrical communication with divert control module 26.

When a particular package 70 is to be diverted onto branch conveyor 5, a signal is sent from control system 60 to divert control module 26 to thereby cause the selective actuation of diverter 25a, and at least one of diverters 25b through 25i to thereby divert at least two diverting shoes 14. One diverting shoe will be diverted along a downstream diverting track, preferably track 50b, and one along another track thereof, such as the other downstream diverting track 50a, or an upstream diverting track 40. Specifically, the divert control module 26 will effect actuation of diverter 25a farthest downstream along main conveyor 9, which corresponds to downstream diverting track 50b, and the leading end 68 of package 70 to be diverted. Simultaneously, control divert module 26 will actuate a diverter 25b through 25i along a downstream diverting track 50a or along a particular upstream diverting track 40, whichever is most proximate to the trailing end 69 of package 70.

Consequently, diverting shoes 14 will be diverted along downstream diverting track 50b, and along downstream diverting track 50a, or a particular upstream diverting track 40. This will effect non-rotational movement of package 70 out of line with other packages traveling along conveyor surface 9. If the upstream one of diverting shoes 14 is diverted to an upstream diverting track 40, the particular diverting shoe 14 urges trailing end 69 of package 70 and contacts second section 44. Subsequent movement of diverting shoe 14 along second section 44 imparts a rotational force upon package 70 to thereby orient leading end 68 of package 70 in a direction substantially orthogonal to the direction of movement of branch conveyor 5. The lateral speed of the diverting shoes actuated along downstream diverting track 50b and on an upstream diverting track 40 will be substantially equal while the diverting shoe traveling along upstream diverting track 40 is located in linear section 42. Once the diverting shoe engages second section 44, however, the lateral speed of the diverting shoe traveling along downstream diverting track 50b increases compared to the lateral speed of the diverting shoe traveling on successive second sections 44. This difference in lateral speed rotates leading edge 68 of package 70 towards branch conveyor 5. Once diverting shoe 14, travelling on successive second sections 44, converges into downstream diverting track 50b, the rotational movement of package 70 ceases, and it is thereafter diverted in a direction substantially parallel to the direction of main conveyor 9. The degree of rotation of package 70 may be degrees less than or equal to the angle α, formed at the intersection of main conveyor 9 and branch conveyor 5. Preferably, the degree of rotation of package 70 is substantially equal to the angle α, formed at the intersection of main conveyor 9 and branch conveyor 5.

A conveyor system 10, illustrated in FIGS. 1 and 2, depicts a pair of downstream diverting tracks 50a and 50b. If a package 70 to be diverted has a length less than the distance between diverters 25a and 25b, the package will be diverted by the actuation of diverters 25a and 25b to thereby diverting a pair of diverting shoes 14 along downstream diverting tracks 50a and 50b. Packages of this lenght will be transported substantially parallel to the direction of movement of main conveyor 9 and will not experience a rotational force. For packages having a length greater than the distance between diverters 25a and 25b, control system 60 will cause the simultaneous diversion of a diverting shoe along the farthest downstream diverting track 50, and at least one along an upstream diverting track 40.

Figure 3:
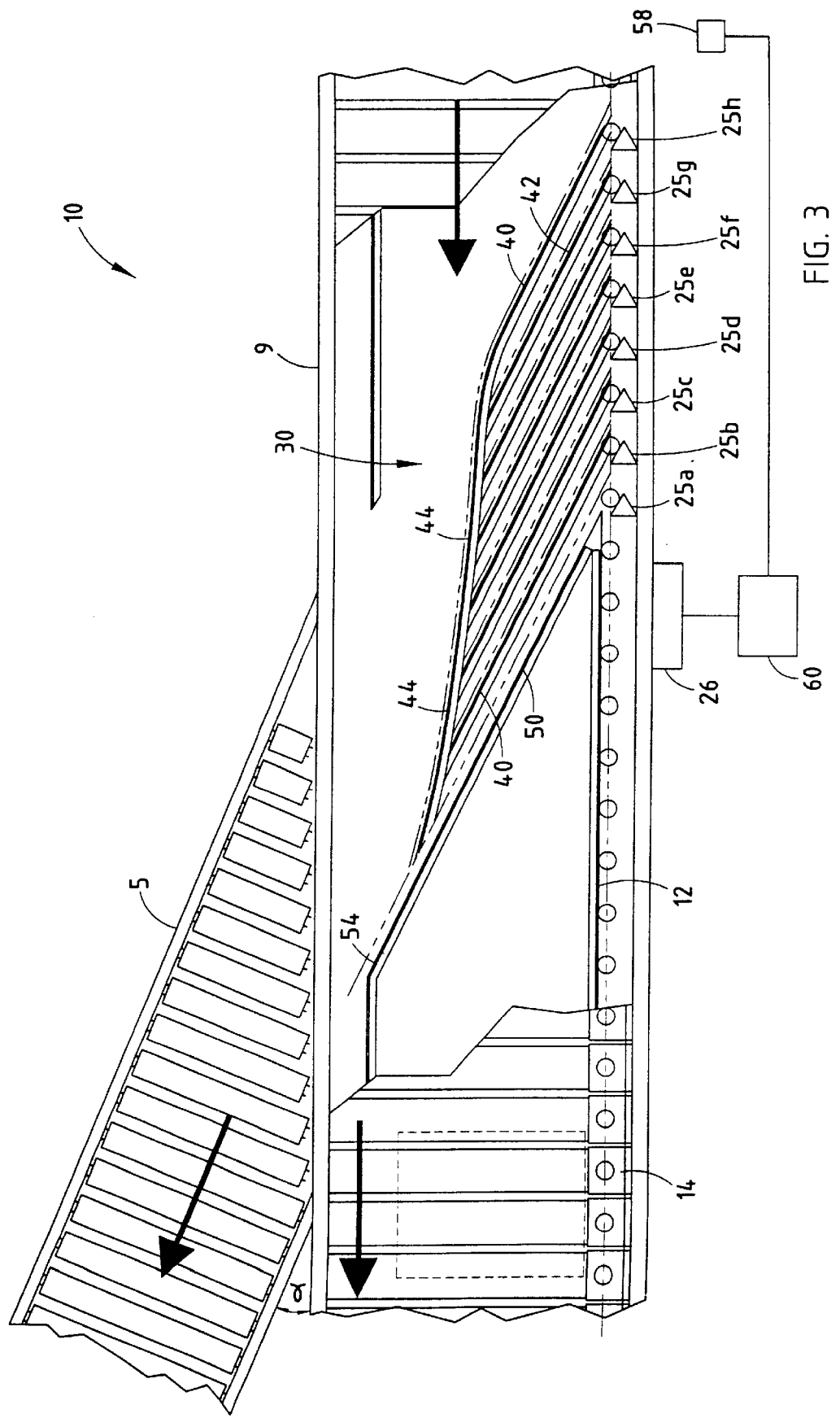
FIG. 3 is the same view as FIG. 2 of an alternative preferred embodiment thereof.

With respect to FIG. 3, conveyor system 10 is shown having only one downstream diverting track 50. In this embodiment, packages of any length will be moved laterally without rotation out of line with other packages traveling along conveyor's surface 9 and will experience a rotational force as it is further diverted, toward the branch conveyor 5 because, in all instances, a diverting shoe will be diverted along both downstream diverting track 50, and at least one upstream diverting track 40.

Figure 4:
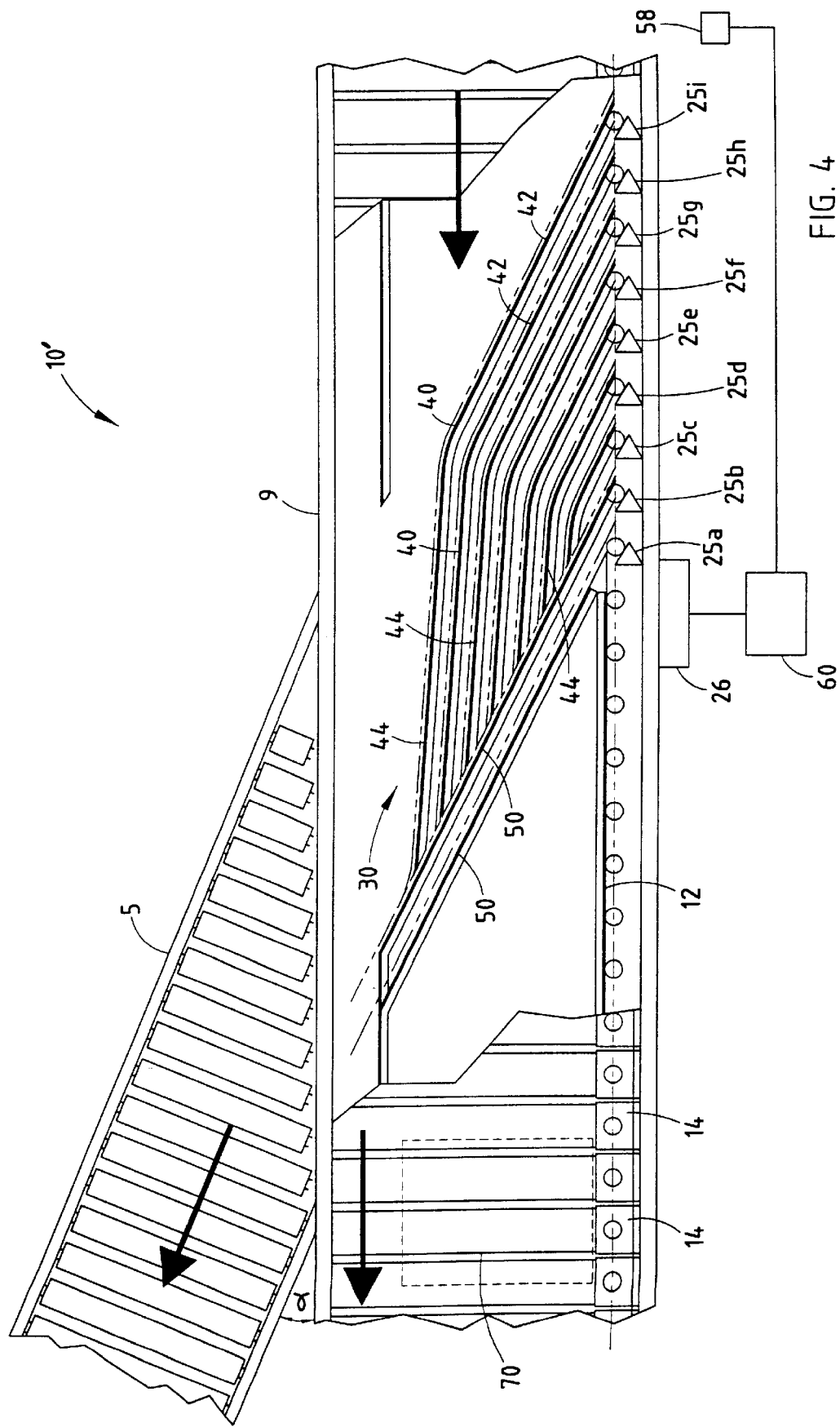
FIG. 4 is the same view as FIG. 2 of another alternative preferred embodiment thereof.

Turning now to FIG. 4, in an alternative preferred embodiment, each upstream diverting track 40 has a second section 44 which, rather than being coupled to an adjacent second section 44 of an adjacent upstream diverting track 40, are each separately connected to a downstream diverting track 50. In all other aspects, conveyor system 10' is structurally and functionally similar to conveyor system 10. Individual attachment of second section 44 to downstream diverting track 50 reduces the noise produced by conveyor system 10' by minimizing the number of mechanical gaps that a diverting shoe 14 must traverse as it is diverting a package toward branch conveyor 5.

Figure 4A:
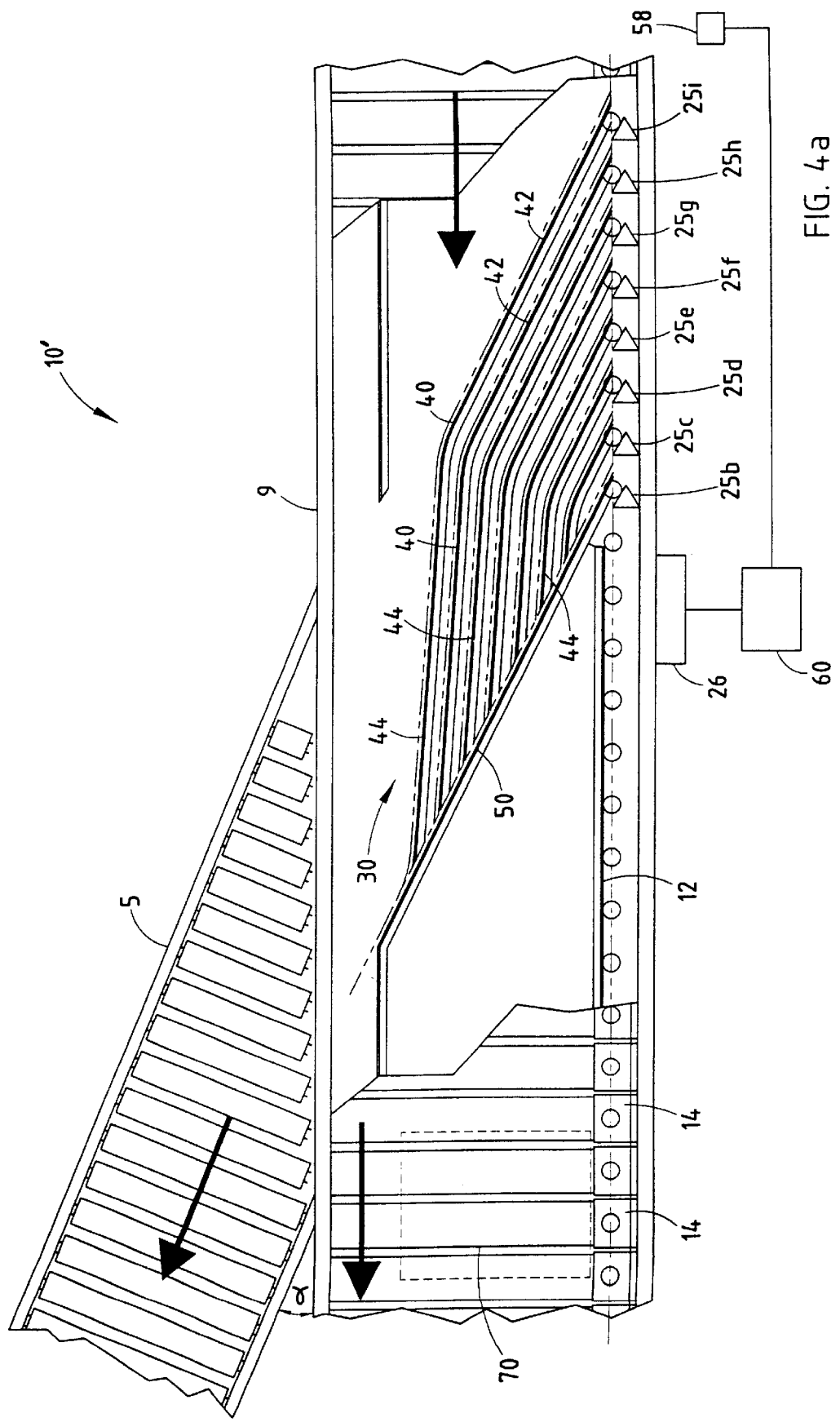
FIG. 4a is the same view as FIG. 2 of yet another alternative preferred embodiment thereof.

FIG. 4a shows another preferred alternative embodiment with the same configuration as FIG. 4, but only one downstream diverting track 50. It will be recognized that in the embodiments of FIGS. 4 and 4a, each second section 44 of upstream diverting tracks 40 may be curved upwards towards downstream diverting track 50 as are the second sections 44 depicted in FIGS. 1 and 2.

Figure 5:
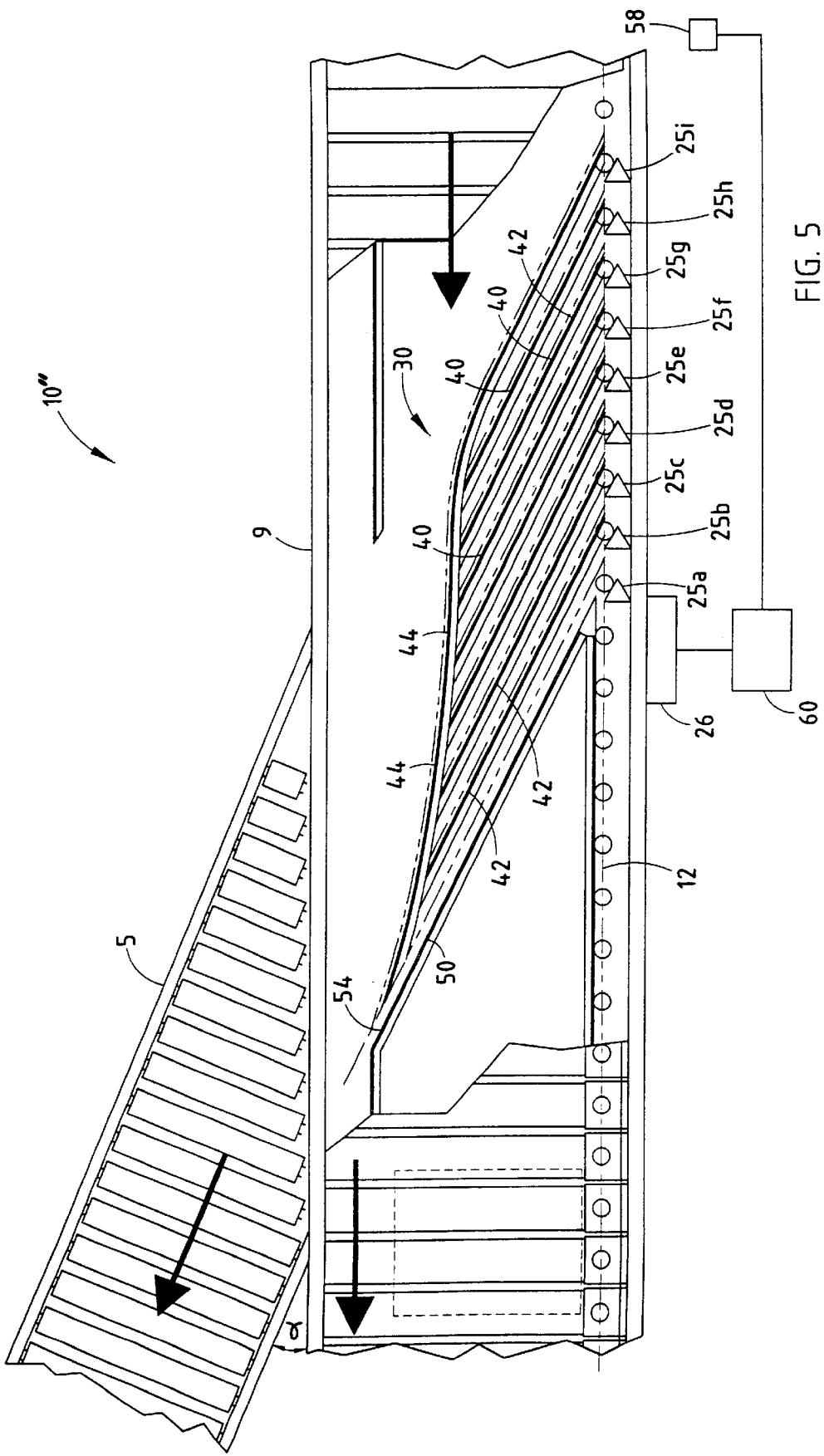
FIG. 5 is the same view as FIG. 2 of still another alternative preferred embodiment thereof.

Referring now to FIG. 5, conveyor system 10" illustrates an embodiment wherein once initially diverted in a substantially parallel direction, the package experiences a continuous rotational force until it is discharged onto branch conveyor 5. This is achieved by each second section 44 of upstream diverting tracks 40 being operably connected to a second section 44 of an adjacent upstream diverting track 40. The second section 44 of the upstream diverting track 40, positioned adjacent to downstream diverting track 50, is operably connected to downstream diverting track 50, proximate to end 54. Consequently, once the diverting shoes 14 are diverted along downstream diverting track 50 and a particular upstream diverting track 40, package 70 will be urged towards branch conveyor 5, but will not begin to rotate until a diverting shoe contacts second section 44 of upstream diverting track 40. Thereafter, package 70 will continue to rotate until being discharged onto branch conveyor 5. In all other aspects, conveyor system 10" is structurally and functionally similar to conveyor system 10.

Figure 6:
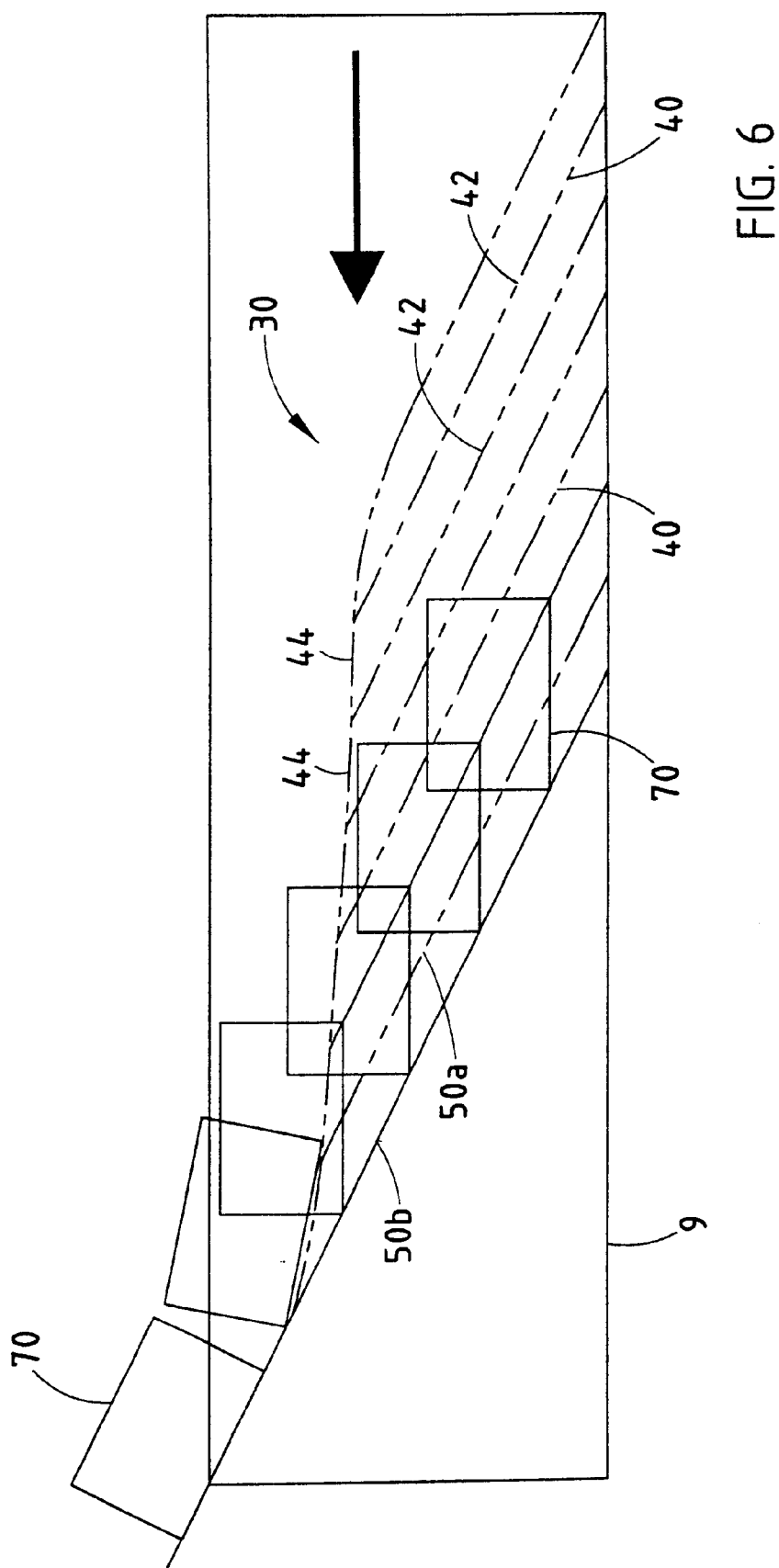
FIG. 6 is a diagram of a single package in various stages of divert, along a downstream track and an upstream track.

FIG. 6 illustrates the diversional sequence of a package being diverted by diverting track network 30. As can be seen, the package will travel in a substantially parallel to the direction of travel of main conveyor 9, indicated by the directional arrow, as the package is diverted out of line with other packages traveling along conveying surface 1, until a rotational force is subsequently imparted upon the package as a diverting shoe 14 contacts second section 44, and continues travel therealong.

Figure 7:
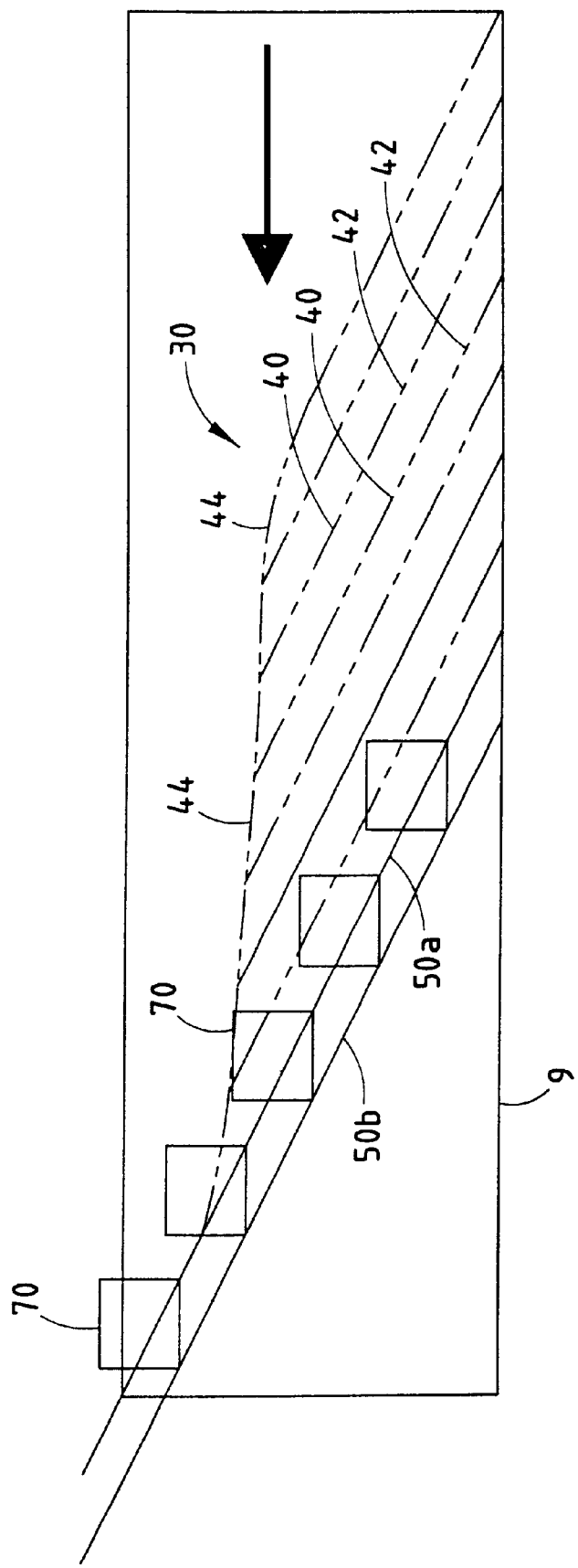
FIG. 7 is a diagram of a single package in various stages of divert, along a pair of downstream tracks.

FIG. 7 illustrates the diversional sequence of a package being diverted by downstream diverting track 50a and 50b of diverting track network 30. As can be seen, the package being diverted will travel in a substantially parallel direction of travel of main conveyor 9, throughout the length of main conveyor 9, until it is discharged onto a branch conveyor.

Figure 8:
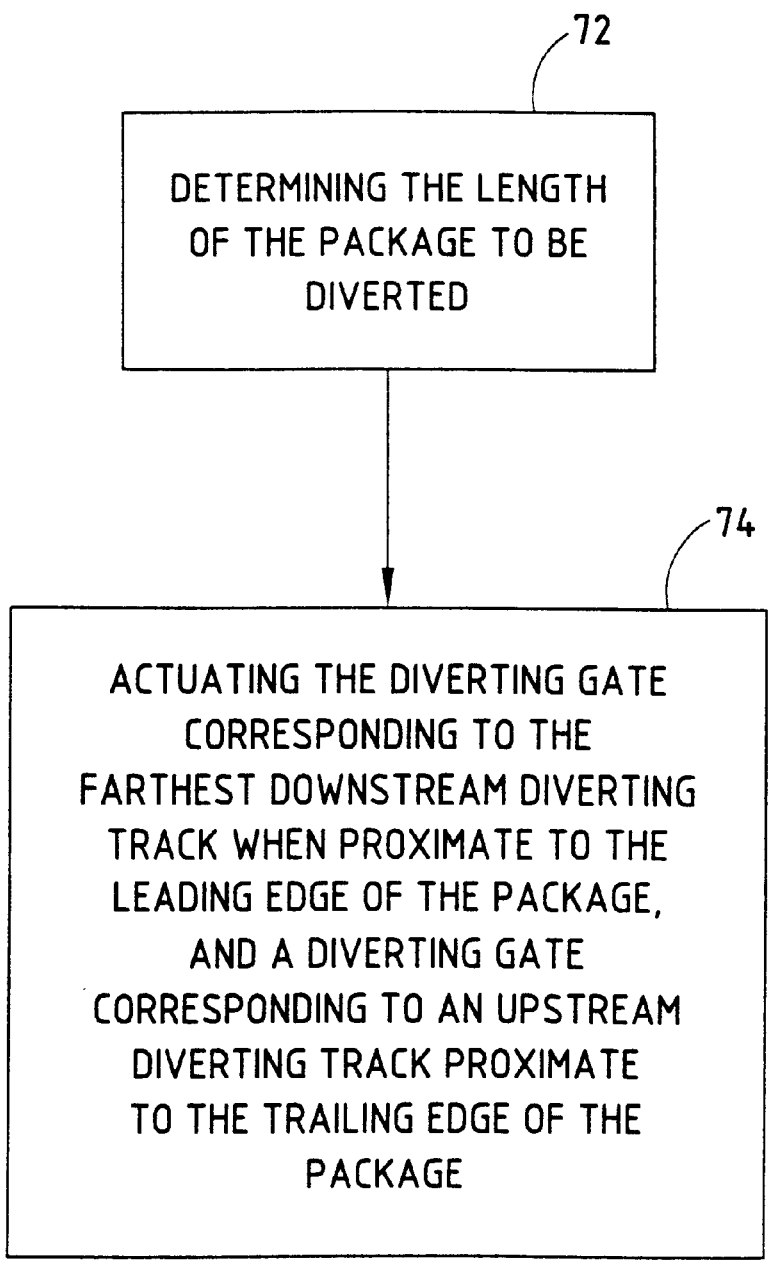
FIG. 8 is a flow chart of a method for diverting a package according to the invention.

Turning now to FIG. 8, there is shown a diagrammatic representation of the control sequence necessary to divert a package according to the present invention. The control sequence includes determining at 70 the length of a package to be diverted. Thereafter, once the package is positioned over the farthest downstream diverting track 50, the diverting associated with the farthest downstream diverting track 50 and at least one diverting gate associated with an upstream diverting track 40, are simultaneously diverted at 72. The choice of which upstream diverting gate is to be activated along with the downstream diverting gate is dictated by the length of the package to be diverted. Specifically, the upstream diverting gate most proximate to the trailing end of the package will be actuated.

Although the invention is illustrated with two shoes diverting each package, it could be implemented with three or more shoes diverting each package. The invention is not intended to be limited by the configuration of the diverting shoe 14, the surface members 13 or diverters 25a–25i.

Having described the invention in connection with certain specific embodiments thereof, it is to be understood that the description is meant to be interpreted as illustrative only, and that various modifications may also be made by those skilled in the art without departing from the spirit and scope of the invention as expressed in the accompanying claims.

The embodiments of the invention in which an exclusive property or privilege is claimed are defined as follows:

1. A conveyor system comprising:
   a conveying surface for conveying articles substantially in a line, said conveying surface having a direction of travel;
   a plurality of movable pushers mounted on said conveying surface and adapted to move transversely across said conveying surface;
   a diverting track network positioned below said conveying surface, said diverting track network including at least one downstream diverting track that traverses substantially the entire conveying surface and a plurality of upstream diverting track that partially traverse said conveying surface, said diverting track network configured to guide at least two movable pushers substantially perpendicular to said direction of travel for at least an initial distance to divert the article out of line with the other articles, and subsequently guide said at least two movable pushers in a direction causing the rotation of at least some of the articles after the article is diverted out of line with the other articles.

2. A conveyor system comprising:
   a conveying surface for conveying articles substantially in a line, said conveying surface having a direction of travel;
   a plurality of movable pushers mounted on said conveying surface and adapted to move transversely across said conveying surface;
   a diverting track network positioned below said conveying surface, said diverting track network including at least one downs stream diverting track that traverses substantially the entire conveying surface, and a plurality of upstream diverting tracks wherein each upstream diverting track has a first section generally parallel to said at least one downstream diverting track, and a second section curved toward said at least one downstream diverting track, said diverting track network configured to guide at least two movable pushers substantially perpendicular to said direction of travel for at least an initial distance to divert the article out of line with the other articles, and subsequently guide said at least two movable pushers in a direction causing the rotation of at least some of the articles after the article is diverted out of line with the other articles.

3. The conveyor system as recited in claim 2, wherein said second section extends from said first section at an obtuse angle.

4. The conveyor system as recited in claim 2, wherein each second section of each upstream diverting track terminates adjacent said at least one downstream diverting track.

5. The conveyor system as recited in claim 2, wherein said second section of each upstream diverting track of said plurality of upstream diverting tracks is operably connected to the second section of an adjacent upstream diverting track.

6. The conveyor system as recited in claim 2, wherein said at least one downstream track is a pair of downstream tracks, and wherein said second section of each upstream diverting track is operably connected to a downstream diverting track of said pair of downstream diverting tracks.

7. The conveyor system as recited in claim 2, wherein said conveying surface has a first side and an opposing second side, said at least one downstream diverting track laterally extending from said first to said second side, where said second section of each upstream track terminates adjacent said at least one downstream track, proximate to said second side.

8. A conveyor system for diverting articles comprising:
   a conveying surface moving in a particular direction, said conveying surface defining a pair of opposing sides;
   at least one branch conveyor extending from said conveying surface such that articles traveling on said conveying surface can be diverted onto said at least one branch conveyor;
   a plurality of diverters movable between a diverting state and a non-diverting state;
   a plurality of movable pushers mounted on said conveying surface, each movable pusher configured to move from one side to the other side of said pair of opposing sides when a diverter of said plurality of diverters is in said diverting state;
   a control system configured to determine the length of articles conveyed on said conveying surface; and
   a diverting system operably connected to said control system, said diverting system having at least one downstream diverting track extending substantially across said conveying surface, and a plurality of upstream diverting tracks, each upstream diverting track extending partially across said conveying surface, wherein said diverting system simultaneously diverts at least one movable pusher along said at least one downstream diverting track when the leading end of the article to be diverted is positioned over said at least one downstream diverting track, and at least one movable pusher along at least one upstream diverting track of said plurality of upstream diverting tracks proximate to the trailing end of the article.

9. The conveyor system as recited in claim 8, wherein each upstream diverting track is operably connected to an adjacent upstream diverting track.

10. The conveyor system as recited in claim 8, wherein each upstream diverting track terminates adjacent said at least one downstream diverting track.

11. The conveyor system as recited in claim 8, wherein said pair of opposing sides include a first side remote from said at least one branch conveyor and a second side proximate to said at least one branch conveyor, wherein each upstream diverting track terminates adjacent said at least one downstream diverting track, and proximate to said second side.

12. The conveyor system as recited in claim 8, wherein each upstream diverting track of said plurality of upstream diverting tracks has a first section substantially parallel to said at least one downstream diverting track, and a second section configured to rotate the article being diverted.

13. The conveyor system as recited in claim 12, wherein said second section of each upstream diverting track extends from said first section at an obtuse angle, and towards said at least one downstream diverting track.

14. The conveyor system as recited in claim 12, wherein said second section of each upstream diverting track includes a terminal portion which is curved toward said at least one downstream diverting track.

15. The conveyor system as recited in claim 12, wherein said second section of each upstream diverting track terminates adjacent to said at least one downstream diverting track.

16. The conveyor system as recited in claim 12, wherein said second section of each upstream diverting track of said plurality of upstream diverting tracks is operably connected to the second section of an adjacent upstream diverting track.

17. The conveyor system as recited in claim 12, wherein said at least one downstream track is a pair of downstream tracks, and wherein said second section of each upstream diverting track is operably connected to a downstream diverting track of said pair of downstream diverting tracks.

18. A conveyor system for diverting articles, wherein each article has a leading end and a trailing end, said conveyor system comprising:
   an array of movable surface members defining a conveying surface, said conveying surface defining two sides, and having a direction of travel;
   a plurality of diverting shoes mounted on said surface members and adapted to move transversely across said conveying surface from one of said sides to the other of said sides;
   a guide track disposed below said array of movable surface members, said guide track adapted to guide said diverting shoes;
   a plurality of diverters positioned along and interrupting said guide track, said diverters configured to assume either a non-diverting state or a diverting state, said non-diverting state allowing said diverting shoes to continue to move along said guide track uninterrupted, and said diverting state causing said diverting shoes to be diverted from said guide track;
   a diverting track network positioned underneath said conveying surface and meeting said diverters, said diverting track network including at least one downstream diverting track extending substantially across said conveying surface, and a plurality of upstream diverting tracks, each upstream diverting track extending partially across said conveying surface;
   at least one sensor positioned in proximity to said conveying surface for determining the length of articles conveyed on said conveying surface;
   a controller in operable connection with said at least one sensor and said diverting track network, said controller simultaneously actuating a first diverter farthest downstream of said plurality of diverters to divert a diverting shoe along said at least one downstream diverting track, and a second diverter of said plurality of diverters, wherein said first diverter is proximate to the leading end of the article, and said second diverter is proximate to the trailing end of the article.

19. The conveyor system as recited in claim 18, wherein said at least one downstream diverting track is one downstream diverting track, and wherein said second diverter diverts a diverting shoe along an upstream diverting track of said plurality of upstream diverting tracks.

20. The conveyor system as recited in claim 18, wherein said at least one downstream diverting tracks is a first downstream diverting track and a second downstream diverting track, said first downstream diverting track positioned downstream of said second downstream diverting track, and wherein said second diverter diverts a diverting shoe along one of said second downstream diverting track and an upstream diverting track of said plurality of upstream diverting tracks.

21. The conveyor system as recited in claim 18, wherein said conveying surface conveys articles substantially in a line, and wherein said at least one downstream diverting track and said plurality of upstream diverting tracks are configured to guide at least two diverting shoes substantially perpendicular to said direction of travel for at least an initial distance to divert the article out of line with the other articles and subsequently guide said at least two diverting shoes in a direction causing the rotation of at least some of the articles after the article is diverted out of line with the other articles, wherein articles can be diverted from a line of articles with minimum spacing between articles, irrespective of article length.

22. The conveyor system as recited in claim 18, wherein each upstream diverting track has a first section which is substantially parallel to said at least one downstream diverting track, and a second section configured to rotate the article.

23. The conveyor system as recited in claim 22, wherein said at least one downstream diverting track is substantially linear.

24. The conveyor system as recited in claim 22, wherein said second section extends from said first section at an obtuse angle.

25. The conveyor system as recited in claim 22, wherein said second section converges with said at least one downstream diverting track.

26. The conveyor system as recited in claim 22, wherein said second section of each first diverting track is operably attached to said second section of an adjacent upstream diverting track.

27. The conveyor system as recited in claim 26, wherein said second section of the upstream diverting track positioned between an upstream diverting track of said plurality of upstream tracks and said at least one downstream diverting track is operably connected to said at least one downstream diverting track.

28. The conveyor system as recited in claim 22, wherein said second section of each upstream diverting track terminates adjacent said at least one downstream diverting track.

29. A method for diverting articles from a conveyor having a conveying surface defined by a series of laterally extending parallel surface members traveling in a longitudinal direction and a plurality of pushers laterally moveable on the surface member, said method comprising the steps of:
   providing a diverting track network positioned below said conveying surface wherein said diverting track network is configured to guide said at least two pushers, said diverting track network comprising at least one downstream diverting track laterally traversing substantially the entire conveying surface and a plurality of upstream diverting tracks, each upstream diverting track partially traversing the conveying surface and having a first section substantially parallel to said at least one downstream diverting track, and a second section curved toward said at least one downstream diverting track;

conveying articles substantially in a line with the conveying surface;

applying a perpendicular force component to substantially all articles to be diverted that is substantially perpendicular to the direction of conveyor motion, thereby diverting the article initially out of line with other articles, said applying a perpendicular force comprising engaging the article with at least two of the pushers during an initial portion of the diverting motion; and altering the perpendicular force component for at least some of the articles after the article is diverted out of line with other articles, by including a rotational force component with the substantially perpendicular force component during a subsequent portion of the diver motion.

30. The method as recited in claim 29, wherein said second section of each upstream track terminates adjacent said at least one downstream diverting track.

31. The method as recited in claim 30, wherein said second section of each upstream track terminates adjacent to the second section of an adjacent upstream track.

32. A method for diverting articles from a conveyor having a conveying surface defined by a series of laterally extending parallel surface members traveling in a longitudinal direction and a plurality of pushers laterally moveable on the surface members, said method comprising the steps of:

measuring the length of the articles conveyed along the conveying surface;

providing a diverting track network beneath the conveying surface comprising at least one downstream diverting track laterally traversing substantially the entire conveying surface, and a plurality of upstream diverting tracks partially laterally traversing the conveying surface, providing a plurality of diverters configured to move the pushers along the associated track, at least partially across conveying surface, when a diverter is activated to a diverting state; and simultaneously activating at least two of said plurality of diverters, one diverter associated with said at least one downstream diverting track and positioned proximate to the leading end of the article to be diverted, and the other diverter proximate to the trailing end of the article.

33. The method as recited in claim 32, wherein said activating step sequentially moves the article generally perpendicular to the direction of travel of the conveying surface, and rotates the article.

34. The method as recited in claim 32, wherein each upstream diverting track is aligned parallel to said at least one downstream diverting track on the side of the conveying surface nearest to said plurality of diverters, but meet on the side of said conveying surface opposite to said plurality of diverters.

35. The method as recited in claim 32, wherein each upstream diverting track is oriented parallel to each other and said at least one downstream diverting track for a preselected portion of their length, and non-parallel to said at least one downstream diverting track for the remaining portion of their length.

36. A sortation system including a conveying surface and a plurality of diverting assemblies spaced along said conveying surface, each of said diverting assemblies for selectively laterally displacing an article on said conveying surface, at least one of said diverting assemblies comprising:

a plurality of movable pushers associated with the conveying surface and adapted to be movable transversely across the conveying surface;

a plurality of diverting tracks configured to guide selected ones of said movable pushers across the conveying surface;

a plurality of diverters, each said diverters adapted to selectively divert at least one movable pusher along one of said diverting tracks when said diverter is activated into a diverting state; and a controller adapted to select, when an article is to be diverted from the conveying surface, at least two diverters from said plurality of diverters and activate the selected diverters into the diverting state, said selected diverters being separated from each other by at least one intermediate diverter which is not activated into said diverting state.

37. The system of claim 36 further including a sensor for determining the location of a trailing and leading edge of an article to be diverted, said controller further adapted to select said selected diverters based upon the determined location of the trailing and leading edges of the article to be diverted.

38. The system of claim 36 wherein said controller is further adapted to substantially simultaneously activate all of said selected diverters into the diverting state.

39. The system of claim 36 wherein said controller is further adapted to divert only a single movable pusher along each diverting track in which a diverter has been activated into the diverting state.

40. The system of claim 36 wherein said plurality of diverting tracks includes at least four diverting tracks and said plurality of diverters includes at least four diverters.

41. The system of claim 36 wherein said plurality of diverting tracks include at least a first diverting track having a first shape and at least a second diverting track having a second shape different from said first shape.

42. The system of claim 36 wherein said plurality of diverting tracks are shaped such that an article to be diverted is initially displaced with a non-rotational force by said movable pushers and subsequently displaced with a rotational force by said movable pushers.

43. The system of claim 36 wherein at least two of said plurality of diverting tracks converge.

44. The system of claim 36 wherein at least some of said diverting tracks in said plurality of diverting tracks include a first and a second section, said first sections being parallel to each other and oriented at a first angle, said second sections being parallel to each other and oriented at a second angle, said second angle being different from said first angle.

45. The system of claim 36 wherein said plurality of diverting tracks includes an upstream-most diverting track into which at least one other of said plurality of diverting tracks merges.

46. The system of claim 45 further including a downstream diverting track which does not merge with any other diverting tracks.

47. A method for laterally displacing an article on a conveying surface of a conveyor:

providing a plurality of movable pushers associated with the conveying surface and adapted to be movable transversely across the conveying surface;

providing a plurality of diverting tracks configured to guide selected ones of said movable pushers across the conveying surface;

providing a plurality of diverters, each said diverter adapted to selectively divert at least one movable pusher along one of said diverting tracks when said diverter is activated into a diverting state;

determining a length of an article to be diverted;

selecting at least two diverters from said plurality of diverters based upon the determined length of the article to be diverted, said selected diverters including a first and second diverter which are separated from each other by at least one intermediate diverter, and activating said first and said second diverters into the diverting state while maintaining said at least one intermediate diverter in a non-diverting state.

48. The method of claim 47 further including activating said first and said second diverters substantially simultaneously.

49. The method of claim 47 further including determining a location of a leading and trailing edge of an article to be diverted, activating said first diverter into said diverting state when the leading edge of the article to be diverted is adjacent said diverter, and activating said second diverter into said diverting state when the trailing, edge of the article to be diverted is adjacent said diverter.

50. The method of claim 47 further including providing at least four diverting tracks and at least four diverters.

51. The method of claim 50 wherein said diverting tracks are parallel to each other.

* * * * *

UNITED STATES PATENT AND TRADEMARK OFFICE
CERTIFICATE OF CORRECTION

PATENT NO. : 6,513,642 B1
DATED : February 4, 2003
INVENTOR(S) : Shearer et al.

It is certified that error appears in the above-identified patent and that said Letters Patent is hereby corrected as shown below:

Title page,
Item [75], Inventors, "William W. Viet" should be -- Frank W. Veit --.

Column 5,
Line 47, insert -- 9 -- after "conveyor" in the first occurrence.

Column 7,
Line 60, "2." should be -- 2, --.
Line 65, "diverting" should be -- divert -- in the first occurrence.
Line 66, "lenght" should read -- length --.

Column 9,
Line 41, "track" should be -- tracks --.
Line 59, "downs stream" should be -- downstream --.

Column 12,
Line 26, insert -- , -- after "articles".
Line 64, "member" should be -- members --.

Column 13,
Line 22, "diver" should be -- diverting --.
Line 27, "claim 30" should be -- claim 29 --.
Line 43, "," should be -- ; --.

Column 15,
Line 13, "," should be -- ; -- after "diverter".

UNITED STATES PATENT AND TRADEMARK OFFICE
CERTIFICATE OF CORRECTION

PATENT NO. : 6,513,642 B1
DATED : February 4, 2003
INVENTOR(S) : Shearer et al.

It is certified that error appears in the above-identified patent and that said Letters Patent is hereby corrected as shown below:

Column 16,
Line 9, delete "," after "trailing".

Signed and Sealed this

First Day of November, 2005

JON W. DUDAS
*Director of the United States Patent and Trademark Office*